United States Patent [19]
Hart et al.

[11] 4,029,146
[45] June 14, 1977

[54] CORRUGATED SHEET HEAT EXCHANGER

[75] Inventors: Wallace F. Hart; Ralph A. Koenig, both of Tulsa, Okla.

[73] Assignee: John Zink Company, Tulsa, Okla.

[22] Filed: July 18, 1975

[21] Appl. No.: 596,984

Related U.S. Application Data

[63] Continuation of Ser. No. 457,065, April 1, 1974, abandoned.

[52] U.S. Cl. .............................. 165/166; 122/223; 122/DIG.1
[51] Int. Cl.$^2$ .......................................... F28F 3/08
[58] Field of Search .......... 165/121, 122, 154, 157, 165/166, 130, 134, 135; 122/210, 223, DIG. 1; 432/222, 223; 110/56

[56] References Cited

UNITED STATES PATENTS

| | | | |
|---|---|---|---|
| 1,686,614 | 10/1928 | Hume | 165/166 |
| 1,750,850 | 3/1930 | Mantle | 165/166 X |
| 1,751,757 | 3/1930 | Phillips | 165/166 |
| 1,775,103 | 9/1930 | Hume | 165/166 |
| 2,303,157 | 11/1942 | Bush | 165/121 X |
| 2,526,157 | 10/1950 | Ramen | 165/82 |
| 3,001,766 | 9/1961 | Laist | 165/135 |
| 3,225,824 | 12/1965 | Wartenburg | 165/122 |

*Primary Examiner*—C. J. Husar
*Assistant Examiner*—Theophil W. Streule, Jr.
*Attorney, Agent, or Firm*—Head, Johnson & Chafin

[57] ABSTRACT

A corrugated plate heat exchanger for effecting temperature transfer between two isolated fluids. The heat exchange elements comprise a plurality of elongated corrugated plates arranged to provide dual isolated flow channels therethrough. The arrangement of the corrugated plates also provides the capability of introducing the first fluid through one end of the exchanger and out the other end while introducing the second fluid at the sides of the exchanger to readily adapt said changer to both counter-flow and cross-flow operations.

6 Claims, 8 Drawing Figures

CORRUGATED SHEET HEAT EXCHANGER

This is a continuation of application Ser. No. 457,065, filed Apr. 1, 1974 now abandoned.

BACKGROUND OF THE INVENTION

1. Field of the Invention

The present invention relates to counter-flow or cross-flow heat exchangers and more particularly, but not by way of limitation to a corrugated plate exchanger which is simply constructed and efficient in operation. The present invention is particularly suited for but not limited to exchange of heat between a combustion process flue gas and an incoming fluid stream whether it be combustion air, waste gas to be incinerated or the like.

2. Description of the Prior Art

It is well known that the exchange of heat between a cold stream entering a process and a hot stream exiting a process (or vice versa) leads to a reduction in the net energy requirements of the process. Hence, it is common practice on boilers, gas turbines, waste incinerator systems and the like to use hot flue gases exiting the system to preheat the incoming combustion air and/or waste gas or liquid by means of some type of exchanger.

Also, in the cryogenic systems, such as air liquification plants, hydrogen separation plants and the like, it is common practice to exchange heat between the cold products streams and the warmer raw material feed streams to reduce the refrigeration requirements for the overall process.

Another factor effecting the cost and size of the heat exchanger is the efficiency of the heat transfer surface. An almost infinite number of combinations of heat transfer surface geometrics can be used for heat exchangers or regenerators.

One typical type of design for heat exchangers is the plate-fin exchanger wherein plates are used to separate the two fluids and the fins are used for an indirect heat transfer surface. In this type of exchanger the compressed air flows in the channel or gap between adjacent plates and the hot exhaust gases flow through the fins which are sandwiched between the two plates. The fins are attached to the plates by low resistance welding to create efficient heat transfer paths. However, in this type of construction, there is much intricate welding required to adequately connect the fins to the plates which runs the cost of manufacturing these heat exchange units extremely high.

In one designed configuration the fins referred to above are on the form of a corrugated sheet which serves to space the adjacent plates apart. Then, by a complicated system of manifolds, the cold gas and hot gas is forced to pass adjacent to one another in the alternate flow channels thus created. Again for this configuration the plates and the corrugated sheets must be metallically bonded to effect sufficient heat transfer therebetween.

This metallic bonding can then be made by either a brazing process where the entire unit and all joints are coated with a fusible brazing compound, placed in the furnace and heated to high temperatures to effect the metallic bond or each individual point of contact of metal must be hand or machine welded which has been found to be highly impractical.

In applications where large temperature differences between fluid exist, the corrugated sheet will be on the average a different temperature from the flat plate and tremendous thermal stresses will be developed and whatever bond there is between the corrugated sheet and the flat places has been found to be highly susceptible to rupture.

Other attempts have been made to more effectively transfer the heat between the fluids by means of corrugated plate exchange units such as that disclosed in the patent to D. M. Cox, U.S. Pat. No. 3,451,474, issued on June 24, 1969 and entitled "Corrugated Plate-Type Heat Exchanger." The Cox device is constructed of a a plurality of folded corrugated plate units wherein the corrugations or ridges of each unit are set at an acute angle with respect to each adjacent corrugated plate. This provides each unit with a single passageway therethrough but wherein the surface walls of each passageway are corrugated to make maximum use of the effective surface for which the fluid may come into contact which provides a more efficient use than that of flat metal plates. Since the corrugations of the walls of the Cox exchanger are inclined with respect to each other, the corrugations of the two walls will abut at points where the peaks of the corrugations cross each other which will prevent collapse of the wafer under external pressure. This also provides an inlet into the wafers adjacent each end of the pack whereby one fluid may be introduced at the side adjacent one end thereof and removed near the opposite end thereof. However, the passageways for the exhaust gases constitute a plurality of plenum chambers, one in each plate unit, whereby hot gases entering therein may become dispersed toward one side or the other and not be eventually distributed throughout the exchanger. The Cox patent further teaches the introduction of the high pressure gases into the side walls at one end and removed from the opposite side walls at the diametrically opposite end of the exchanger which would tend to create a flow channel diagonally across the heat exchanger unit which would not fully utilize the counter-flow principle since dead spots or spaces would be allowed to build up on each end of the exchanger opposite the inlet and outlet ports.

SUMMARY OF THE INVENTION

The present invention provides a novel counter-flow or cross-flow heat exchanger of the corrugated plate type which is particularly designed and constructed for overcoming the above disadvantages.

The present invention comprises an elongated housing which contains a plurality of elongated fluid flow channel units. Each channel unit comprises a pair of longitudinally disposed corrugated plates which may be sealed along the outer edges thereof by means of a seam weld or the like for creating a plurality of distinct separate longitudinal flow channels through each flow channel unit. These flow channel units are then disposed within the housing in such a manner that a continuous plenum chamber is provided between each channel unit. The said channel units may also be separated by a plurality of spaced separator rods disposed throughout the exchanger assembly. The plenum chambers between each pair of adjacent channel units are provided by offsetting the corrugations of one unit with each adjacent unit, thereby providing a corrugated shaped high pressure fluid flow passageway between each pair of channel units.

The high pressure fluid between the channel units also serves to press the pairs of corrugated plates of each unit together thereby more firmly sealing the individual hot air flow channels therein. The housing only covers the center portion of the channel units thereby allowing the said channel units to extend beyond the housing at each end thereof. The extension beyond the housing of the channel units allows the higher pressure gas to be introduced into the exchanger units above disadvantages.

The present invention comprises an elongated housing which contains a plurality of elongated fluid flow channel units. Each channel unit comprises a pair of longitudinally disposed corrugated plates which may be sealed along the outer edges thereof by means of a seam weld or the like for creating a plurality of distinct separate longitudinal flow channels through each flow channel unit. These flow channel units are then disposed within the housing in such a manner that a continuous plenum chamber is provided between each channel unit. The said channel units may also be separated by a plurality of spaced separator rods disposed throughout the exchanger assembly. The plenum chambers between each pair of adjacent channel units are provided by offsetting the corrugations of one unit with each adjacent unit, thereby providing a corrugated shaped high pressure fluid flow passageway between each pair of channel units.

The high pressure fluid between the channel units also serves to press the pairs of corrugated plates of each unit together thereby more firmly sealing the individual hot air flow channels therein. The housing only covers the center portion of the channel units thereby allowing the said channel units to extend beyond the housing at each end thereof. The extension beyond the housing of the channel units allows the higher pressure gas to be introduced into the exchanger units from both sides of the unit adjacent one end of the unit. This design also allows the said combustion air gases to be removed from opposite sides of the exchanger adjacent to the opposite end of the changer thereby insuring a direct counter-flow of these gases through the plenum chambers between the hot air channel units thereby providing the most efficient transfer of heat to the said gases. Tube sheets are provided at both ends of the channel units, each tube sheet having a plurality of apertures therein which are aligned with the hot gas flow channels and whereby the ends of the passageways between the units are blocked.

The present invention also provides a unique bypass cooling system adjacent to the hot gas inlet end of the exchanger to protect the heat exchanger elements from damage due to extremely hot exhaust gases entering the said heat exchange unit. Therefore, the present invention comprises a complete corrugated plate type exchanger thereby eliminating the use of inefficient flat plates while simultaneously providing an even distribution of cold gases through the said unit. It is readily apparent that the cold air may be routed through the channel unit passages and the hot air through the corrugated shaped plenum passageways.

It is also obvious that the present invention is not limited to vertical disposition but may be disposed horizontally or at any desired angle.

There is no attempt to designate all of the uses of the present invention but to indicate that the present invention is particularly suited for use with turbines, incinerators, boilers, process heaters, furnaces and the like. Fractional use of the heated fluid may serve as the hot air source for plume abatement or the like.

BRIEF DESCRIPTION OF THE DRAWINGS

Other advantages features of the present invention will hereinafter more fully appear in connection with a detailed description of the drawings in which.

DETAILED DESCRIPTION OF THE PREFERRED EMBODIMENT

Figure 1:
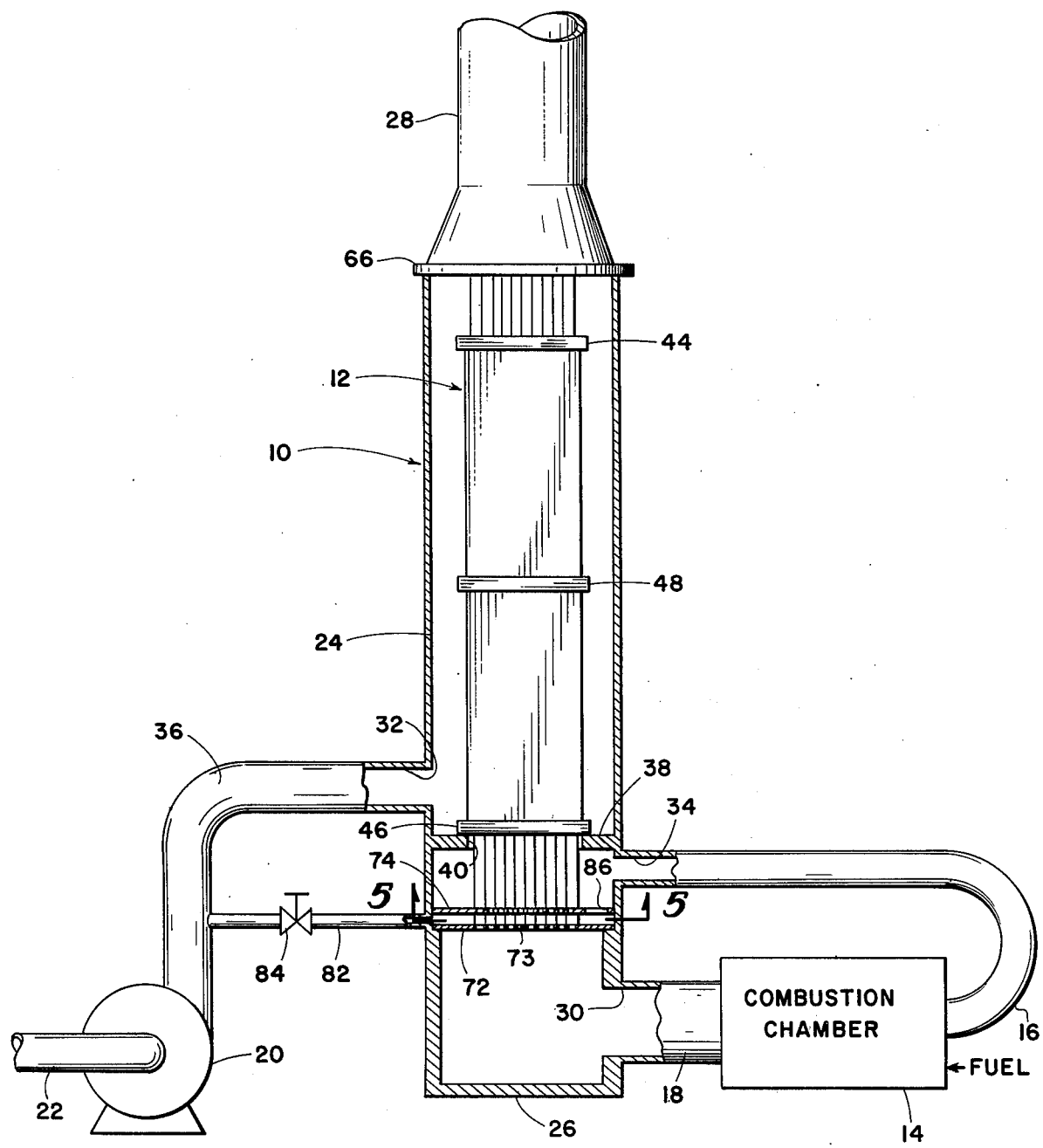
FIG. 1 is an elevational partial sectional view of a combustion chamber turbine engine, incinerator or the like utilizing a counter-flow heat exchanger embodying the present invention.

Referring to the drawings in detail, reference character 10 generally indicates a regenerator which utilizes a counter flow heat exchanger unit 12. The regenerator system 10 generally comprises a combustion chamber 14 which may be an incinerator, gas turbine, boiler or the like having a combustion air intake 16 and a hot gas exhaust 18. combustion air for the combustion chamber 14 is supplied by a compressor or pump indicated at 20 having an intake 22 which is connected to a waste gas source or simply to an open air intake (not shown) said pump having an outlet 36. Naturally, the pump 20 may be utilized to pump any fluid if heating of the said fluid is the primary purpose of the heat exchanger.

For purposes of description in this application the regenerator system 10 will be taken as a device which is used with hot air engines 14 in which the incoming air from the compressor 20 is heated by being passed through fluid channels which are in turn heated by a flow of hot air or gas being exhausted from the combustion chamber 14. The regenerator 10 further comprises a vertically disposed elongated outer housing 24 having a closed lower end 26 with the upper end thereof being provided with an exhaust stack 28. The outer housing 24 is provided with a hot air inlet port 30 located near the base thereof and operably connected to the combustion chamber exhaust outlet 18. A compressor air intake 32 is provided in the outer housing 24 intermediate the hot air exhaust port 30 and the exhaust stack 28 for the purpose of allowing the compressed air from the pump outlet 36 to enter into the outer housing 24. A compressor air outlet port 34 is provided in the outer housing 24 and is disposed intermediate the hot air inlet port 30 and the compressor air inlet port 32, the said port 34 being operably connected to the air intake 16 of the combustion chamber 14. The outer housing 24 of the regenerator system 10 is shown in the drawings to be cylindrical in shape but may assume any suitable cross-sectional shape.

A divider plate 38 having an outer periphery shape to conform to the cross-sectional shape of the inside surface of the outer housing 24 is secured within the said housing 24 intermediate the compressor air inlet port 32 and the compressor air outlet port 34. The divider plate 38 is provided with a centrally disposed rectangular aperture 40 therethrough for a purpose that will be hereinafter set forth.

Figure 2:
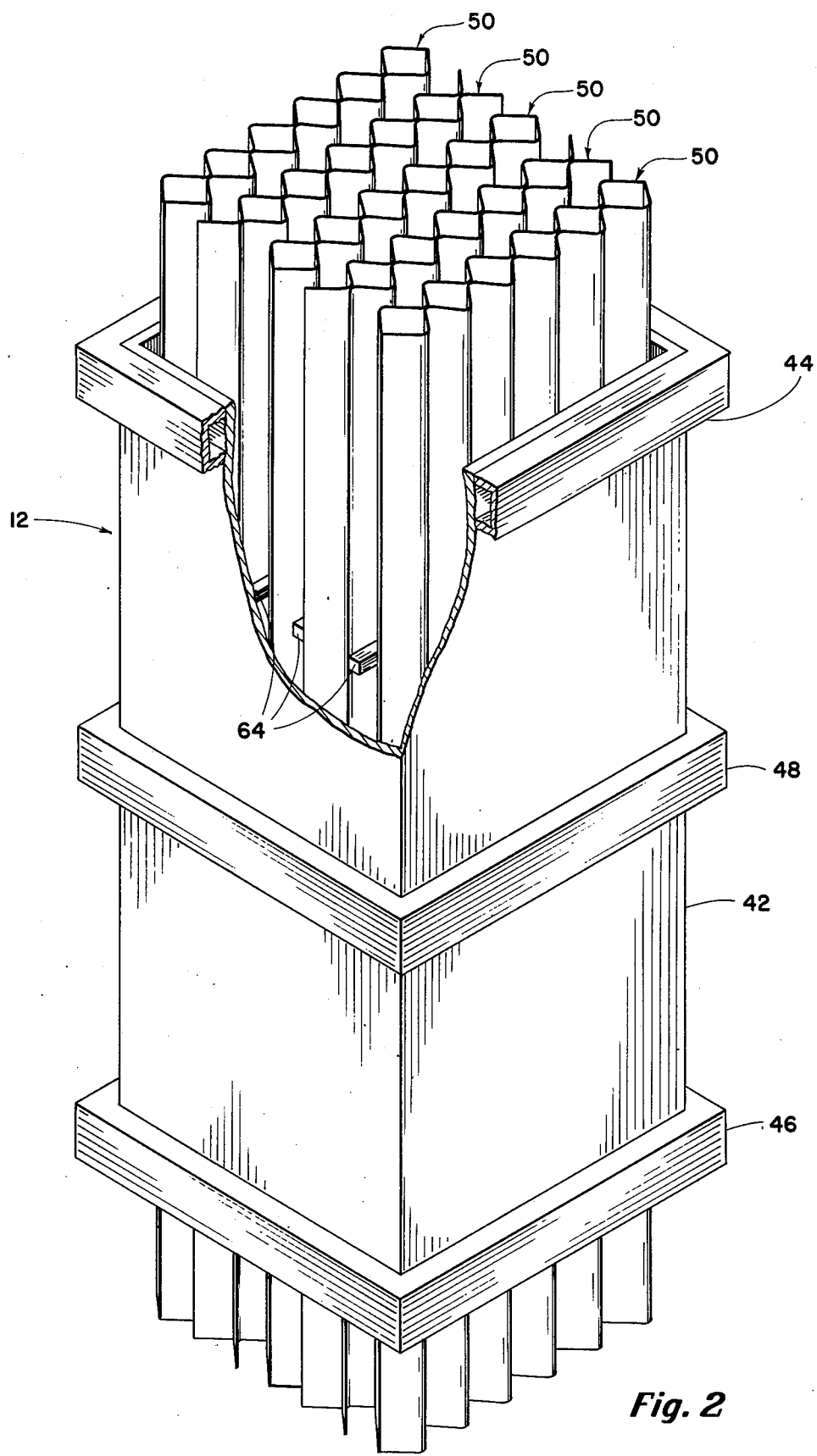
FIG. 2 is a perspective partial sectional view of the heat exchange assembly of FIG. 1.
Figure 3:
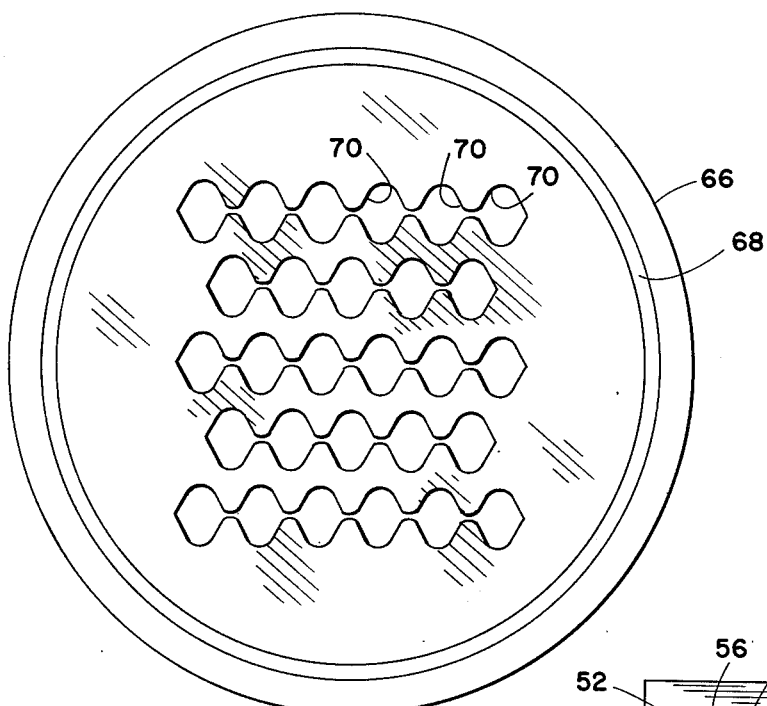
FIG. 3 is a plan view of the exhaust tube sheet of the heat exchanger unit.

Referring now to FIG. 2, the heat exchanger unit 12 generally comprises an inner housing 42 which is rectangular in cross-sectional shape and is open at both ends thereof. The upper end of the housing 42 is provided with a rectangular channel frame 44 around the outer periphery thereof and the lower end of the housing 42 is likewise provided with a rectangular channel frame 46 around the outer periphery thereof, while the center portion is provided with a third substantially identical rectangular shaped channel frame member 48. The said frame members 44, 46 and 48 primarily serving to maintain the said rectangular cross-sectional shape when fluid pressures are applied therein. However, it is noted that the frame members 44, 46 and 48 may be of substantially any configuration and number which provides the needed strength for the plate members making up the inner housing 42.

A plurality of elongated fluid channel units 50 are longitudinally disposed within the inner housing 42 with the outer ends of the said fluid channel units extending beyond the ends of the housing 42. Each fluid channel unit 50 comprises a pair of elongated corrugated plates 52 and 54 which have a plurality of mutually parallel longitudinal corrugation ridges 56 therealong. The plates 52 and 54 are disposed against each other with oppositely facing corrugation ridges 56 in longitudinal abutment with each other thereby forming a plurality of separate and distinct elongated fluid channels 58 running through the entire length of each channel unit 50. The corrugated plates 52 and 54 may be held in this disposition by means of welding the entire length of the outer edges of the said plates 52 and 54 by means of a suitable weld 60. The assembled channel unit 50 therefore provides an elongated rectangular shaped package containing a plurality of mutually parallel distinct flow channels 58 therethrough. These plates are then longitudinally disposed within the housing 42 with the outwardly extending ridges of each unit being traversely offset from the outwardly extending ridges of each adjacent unit thereby providing longitudinal rectangular shaped passageways 62 between each pair of adjacent channel units 50, each said passageway having a cross-sectional shape similar to a sign wave or conforming to the outwardly extending ridge patterns of the channel units 50.

Figure 4:
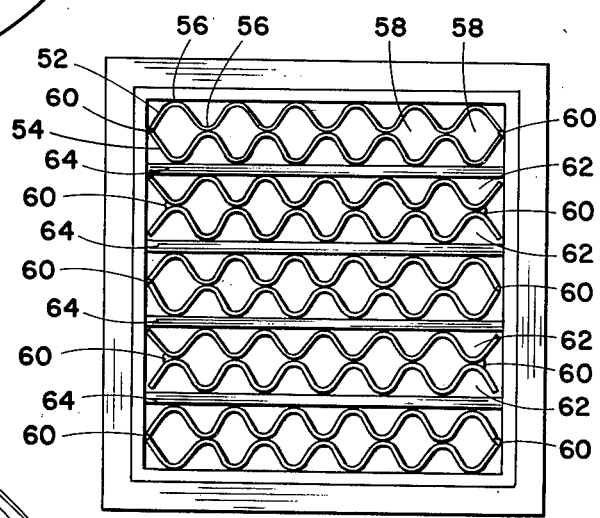
FIG. 4 is a top view of the heat exchanger unit.

A plurality of horizontally extending separator bars 64 may be provided between each adjacent pair of channel units 50 to prevent the said channel units from collapsing or otherwise closing the passageways 62 therebetween. There should be at least one such spaced separator bar 64 between each pair of adjacent channel units 50 when the heat exchange is long so that the said channel units 50 will remain separated and evenly spaced as depicted in FIG. 4. However, when the heat exchange unit is not extremely long, the end attachments will be sufficient to hold the adjacent units apart and the bars 64 are not necessary.

The heat exchanger unit 12 is longitudinally and centrally disposed within the outer housing 24 of the regenerator 10 with the lower rectangular frame member 46 resting directly on the upper surface of the divider plate 38 with the lower end of the channel units 50 extending through the aperture 40 of the said divider plate 38. A tube sheet 66 is secured to the top of the upper housing 24 between the upper end of said housing 24 and the exhaust stack 28. The upper tube sheet 66 may be provided with a suitable expansion joint 68 therearound and is provided with a plurality of apertures 70 therein. The apertures 70 are arranged in alignment with the upper end of the channel units 50 and in direct alignment with the longitudinal flow channels 58 therein. Therefore, fluid or hot exhaust gases passing through the flow channels 58 upwardly will pass through the apertures 70 in the tube sheet 66 and out through the exhaust stack 28. It is readily apparent that since the apertures 70 are in direct alignment with the flow channels 58 of the channel units 50 that the upper end of the fluid passageways 62 between said channel units 50 are blocked by the body of the said tube sheet 66. It is also readily apparent that the passageway 62 between the said channel units 50 are in open communication with the interior of the outer housing 24 and the exterior of the inner housing 42 therein. Therefore, compressed gases from the compressor unit 20 may be introduced into the space between the outer housing 24 and the inner housing 42 by means of the compressor air inlet port 32 whereby said gases may move to the upper portion of this interior chamber and enter into the passageways 62 from either side of the exchanger unit 12.

A second tube sheet 72 which is substantially identical to the tube sheet 66 is secured within the outer housing 24 between the hot gas inlet port 30 and the compressor outlet port 34. The tube sheet 72 is also provided with a plurality of ports 73 therethrough in alignment with the lower ends of the flow channels 58 of the channel units 50.

Figure 5:
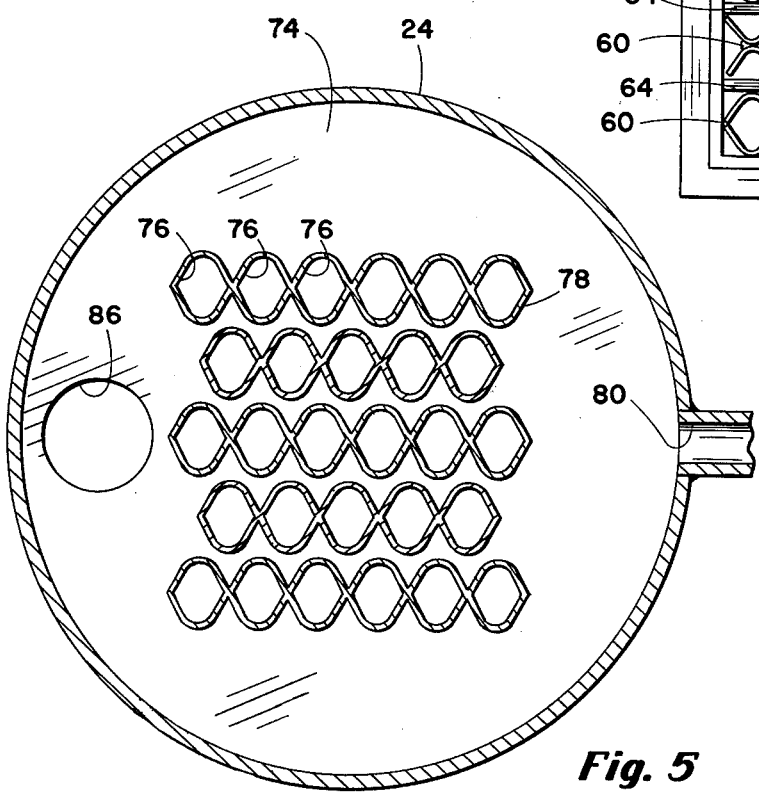
FIG. 5 is a sectional bottom view of a cool air bypass, exhaust assembly for protection of the heat exchange elements due to hot exhaust gases taken along the broken line 5—5 of FIG. 1.

Referring to FIGS. 1 and 5, reference character 74 generally indicates a circular tube sheet which is secured within the outer housing 24 directly above the bottom tube sheet 72 but is between said tube sheet 72 and the compressor air outlet 34. The tube sheet 74 is provided with a plurality of apertures 76 which are in substantial alignment with the apertures 73 of the tube sheet 72 and in open communication with the flow channels 58 of the channel units 50. These apertures 76 may be so aligned to receive the lower ends of the said channel units 50 therethrough so that the lower ends of said channel units may attach directly to the tube sheet 72. However, it is readily apparent that the lower end of the channel units 50 may attach directly to the apertures 76 of the tube sheet 74 which would require a plurality of sleeve members 78 for connecting the apertures 76 of the tube sheet 74 with the apertures 73 of the tube sheet 72.

A compressor air bypass inlet 80 is provided in the outer housing 24 between the tube sheet 72 and 74, the said inlet 80 being connected to a bypass line 82. The bypass line 82 operably connects the output pipe 36 of the compressor 20 with the chamber created within the outer housing 24 and between said tube sheets 72 and 74 through a suitable valve 84. The tube sheet 74 is also provided with an aperture 86 therethrough, said aperture 86 being disposed on the opposite side of the tube sheet from the bypass compressor air inlet 80. Therefore, when the exhaust gases from the combustion chamber 14 enter the outer housing 24 through the hot air exhaust inlet 30, cool air from the compressor may be passed through the bypass line 82 and into the chamber created between the tube sheets 72 and 74. This cooler gas may then circulate through and around the sleeve members 78 or the lower ends of the channel units 50 for the prevention of damage to said channel units due to the extremely hot exhaust gases from the combustion chamber 14. The cooling air entering the said chamber through the bypass inlet port 80 then passes through the aperture 86 in the tube sheet 74 and subsequently passes directly into the compressor air intake line 16 of the said combustion chamber 14.

In operation, when the combustion chamber or turbine engine 14 is being operated exhaust gases therefrom are passed into the lower portion of the outer housing 24 and are directed into the flow channels 58 of the channel units 50 through the tube sheets 72 and 74. These hot gases then pass upwardly through said flow channels 58 and into the exhaust stack 28 through the upper tube plate 66. These gases are then exhausted into the atmosphere or into any suitable exhaust treatment mechanism. Compressor intake air for the said combustion chamber 14 is pumped by means of the pump or compressor 20 into the outer housing 24 through the inlet port 32 and is allowed to circulate around the heat exchanger unit 12 to the upper portion thereof. The said compressor gases then enter the heat exchanger unit 12 through the passageways 62 between the channel units 50. Naturally, some of the gases will enter between the walls of the inner housing 42 and the edgemost channel units 50. The compressor air gases are then passed downwardly through the passageways 62 and into the chamber created between the tube sheet 74 and the divider plate 38. The gases are then directed through the compressor air outlet port 34 and into the air intake line 16 of the combustion chamber 14.

As hereinbefore set forth if the exhaust gases from the combustion chamber 14 are extremely hot, bypass air may be taken from the compressor 20 through the bypass line 82 and its associated valve 84 into the chamber between the tube sheets 72 and 74 for cooling the lower ends of the channel units 50 whereby the said gases will then flow through the aperture 86 and subsequently into the combustion chamber intake line 16 for use by the said combustion chamber 14.

From the foregoing, it is apparent that the present invention provides an efficient counter-flow heat exchanger for preheating combustion air before the use or consumption thereof. This heating is effected by transferring the heat from the exhaust gases of the combustion chamber to the compressor air gases by means of the corrugated plate units 50. It is readily apparent that the corrugated design of the channel units 50 provides the maximum direct heat transfer between the exhaust gases and the incoming compressor air gases. It is further apparent that since the compressor air gases flowing through the passageways 62 of the heat exchange unit 12 are of a higher pressure than the exhaust gases flowing through the longitudinal flow channels 58, this higher pressure between the said channel units 50 will tend to hold the corrugated plates 52 and 54 of each channel unit into a tight sealed relationship thereby providing a plurality of separate and distinct flow channels 58 for equal distribution of the hot gases therethrough.

Whereas the present invention has been described in particular relation to the drawings attached hereto, other and further modifications apart from those shown or suggested herein may be made within the spirit and scope of this invention. For example, the cross-sectional shape of the corrugated plates 52 and 54 making up the channel units 50 are shown to be of a simple sine wave design whereas virtually any suitable corrugation design may be used for effecting the same result in the same manner as that shown or depicted in the drawings of the preferred embodiment herein. As hereinbefore pointed out the heat exchanger is not limited to vertical disposition. Further, the exchanger may be modified to operate as a cross flow exchanger by causing the higher pressure gas to flow into one side of the exchanger and out the opposite side.

The present invention is also suitable for use as a cross flow heat exchanger. A detailed example of this use appears in connection with the bypass cooling system of FIG. 1. The air passing through the bypass pipe 82 and valve 84 is heated while flowing crosswise to the vertical flow channels 58.

Figure 6:
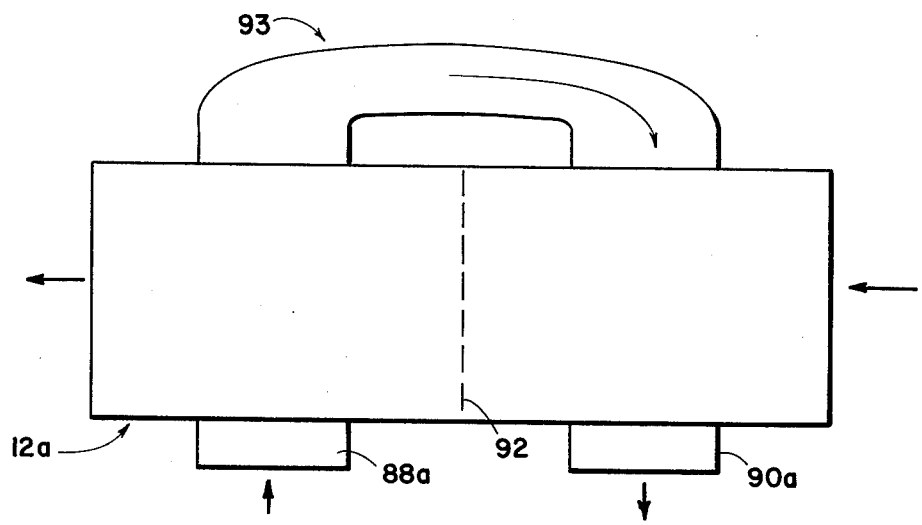
FIGS. 6, 7 and 8 depict various cross-flow heat exchanger configurations utiliizing a heat exchange element embodying the present invention.
Figure 7:
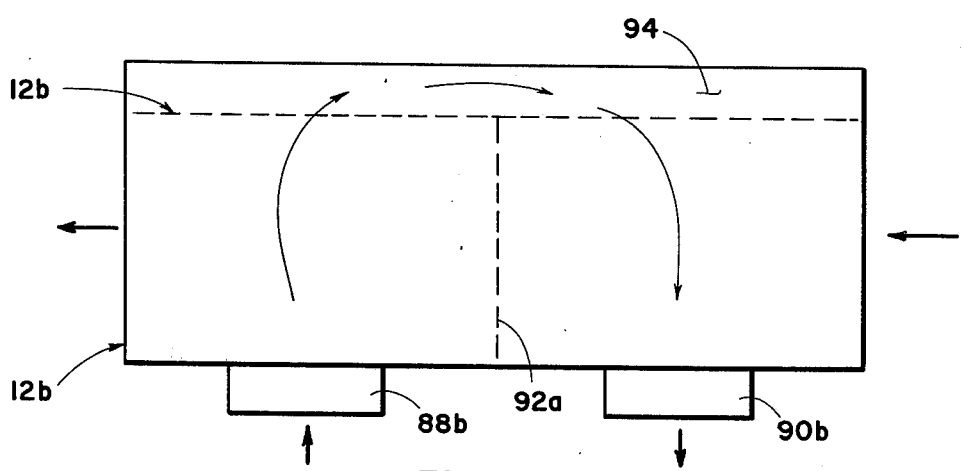
Figure 8:
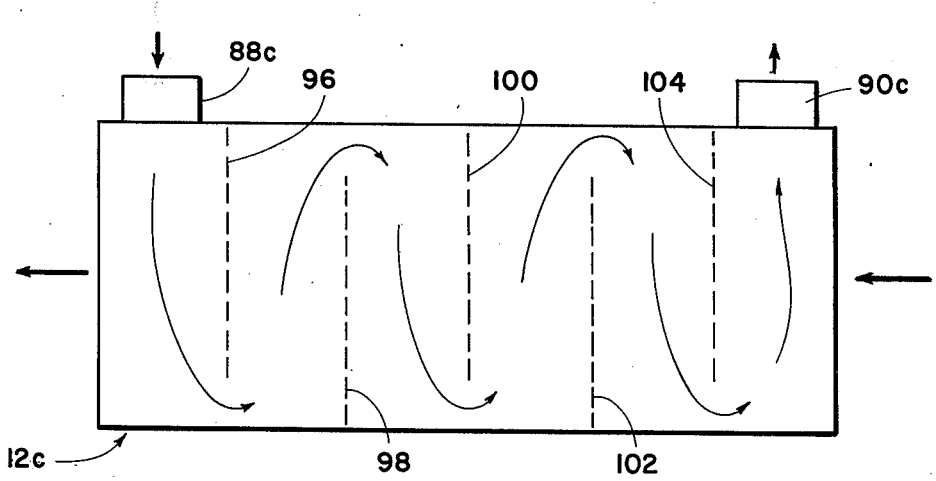

Other uses of the entire exchanger unit 12 as a cross-flow heat exchanger appear in FIGS. 6, 7 and 8 of the drawings.

FIG. 6 depicts a heat exchanger unit 12a which is substantially identical to the unit 12 but having the inner housing 42 extend all of the way to the end of the channel units 50. An air inlet 88a is provided on one side of the exchanger near one end and in open communication with the passageways 62 between the channel units 50. An outlet 90a is provided in the same side of the exchanger unit 12a but at the opposite end thereof and is likewise in communication with the passageways 62 between the channel units 50. The exchanger unit 12a is also provided with a baffle member 92 between the inlet port 88 and the outlet port 90 for blocking the passageways 62 therebetween. The baffle plate 92 is similar to a tube sheet in that the longitudinal passageways 58 extend through the baffle 92 so that hot air may flow longitudinally through the exchanger unit 12a. The opposite sides of the passageways 62 are connected by means of a rerouting pipe or line generally indicated by reference character 93 which is in open communication with both ends of the passageway 62 between the channel units 50.

Therefore, hot air is passed longitudinally through the exchanger unit 12a while the air to be heated thereby is piped into the exchanger unit by means of the inlet port 88a through the exchanger passageways 62, through the pipe 93, back through the passageway 62 of the exchanger 12a and out of the exchanger by means of the outlet 90a.

FIG. 7 also depicts an exchanger 12b having an inlet port 88b and an outlet port 90b in communication with the passageway 62 between the longitudinal channel units 50. In this particular schematic configuration the heat exchanger housing on the opposite side of the inlet and outlet ports 88b and 90b is spaced from the edge of the heat exchanger 12b to provide a plenum chamber 94 whereby air entering the heat exchanger by means of the inlet port 88b is passed through the exchanger in a crosswise manner into the plenum chamber 94 and back through the heat exchanger and out the port 90b. There is a baffle plate 92a to divide the passageway 62 between the inlet and outlet ports 88 and 90.

FIG. 8 depicts a third schematic configuration of a cross-flow heat exchanger unit 12c wherein an inlet port 88c is provided on one side of the exchanger adjacent to one end thereof and in open communication with the passageways 62 between the channel units 50. The opposite end of the heat exchanger 12c is provided with an outlet port 90c which is also in open communication with the passageway 62 therein. A plurality of staggered offset baffles 96 through 104 are spaced throughout the length of the heat exchanger 62c and extend partway across the said heat exchanger to provide a back and forth flow pattern for the air which enters the heat exchanger through the inlet port 88c and exits the heat exchanger through the outlet port 90c.

It is readily apparent that there are many varied configurations for use of the heat exchanger element assembly 12 and only a few of those have been alluded to in the specification.

It is further noted that suitable turning vanes (not shown) may be employed at the top and bottom of the exchanger to more efficiently direct the high pressure gases into the plenum chamber 62 and elsewhere to direct gases into and out of the card exchanger.

What is claimed:

1. A counter-flow heat exchanger for effecting heat transfer between longitudinally flowing first low pressure gas of one temperature and second, relatively higher pressure gases at another temperature comprising:
   a longitudinal rectangular elongated housing;
   a plurality of elongated fluid channel units disposed within the housing and extending beyond the ends of said housing, each said channel unit comprising spaced first pair and a second pair of elongated corrugated plates, each of said plates corrugated transversely to said elongated housing in an oscillatory wave pattern having symmetrical peaks and valleys of constant period, the plates of each pair positioned so that the peaks of one plate unconnectably abut the peaks of the other to create a plurality of distinct longitudinal straight flow passageways through the space created between said valleys for said first gas, said first pair of plates being spaced from said second pair of plates by straight transverse separator rods and said first pair of plates displaced from said second pair of plates 180 degrees out of phase with said wave pattern to create longitudinal counter flow channels on each side of each pair for said second gas;
   a tube sheet secured at each end of said channel units closing the ends of said longitudinal flow channels and having a plurality of apertures therethrough to permit inlet and outlet of said first gas through said flow passageways;
   an annular inlet housing means to communicate said second gas with the space between one of said tube sheets and one end of said elongated housing, and to flow said second gas through said longitudinal flow channels; and
   an annular outlet housing means between the other of said tube sheets and the other end of said elongated housing from which said second gas is withdrawn.

2. A heat exchanger as set forth in claim 1 wherein the wave pattern is sine wave in shape.

3. A counter flow heat exchanger for preheating combustion air, prior to the introduction thereof into a combustion chamber, by use of hot exhaust gases from the combustion chamber and comprising,
   an elongated outer housing closed at the lower end thereof and terminating with an exhaust stack at the upper end thereof;
   an elongated inner housing longitudinally disposed within the outer housing to create an annulus therebetween, said housing open at both ends;
   upper and lower horizontally disposed tube sheets secured within said outer housing;
   an intermediate divider plate to which the lower end of said inner housing is secured creating a lower section between said divider plate and said lower tube sheet;
   a plurality of elongated fluid channel units disposed within the inner housing, the upper end of said channel units extending beyond the upper end of said inner housing and terminating at said upper tube sheet, the lower end of said channel units extending through said intermediate divider plate, and terminating at said lower tube sheet, each said channel unit comprising a spaced first pair and second pair of elongated corrugated plates, each of said plates corrugated in an oscillatory wave pattern having symmetrical peaks and valleys of constant period, the plates of each pair positioned so that the peaks of one plate abut the peaks of the other to create a plurality of distinct longitudinal straight flow passageways through the space created between said valleys, said first pair of plates being spaced from said second pair of plates by straight transverse separator rods and said first pair of plates displaced from said second pair of plates 180° out of phase with said wave pattern to create longitudinal flow channels on each side of each pair,
   means to supply said exhaust gases from said combustion chamber vertically upward through said lower tube sheet into said flow passageways thence through said upper divider plate to said exhaust stack;
   means to supply combustion air into said annulus space between said inner and outer housing thence to the upper end of said flow channels and downward therethrough countercurrent to the flow in said flow passageways to said lower section thence to the inlet of said combustion chamber.

4. The heat exchanger of claim 3 including a third tube sheet divider plate between said intermediate divider plate and said lower tube sheet creating a flow space,
   means to supply combustion air into said flow space.

5. A counter flow heat exchanger as set forth in claim 3 wherein the corrugations of each corrugated plate are sine wave in cross-sectional shape.

6. A counter flow heat exchanger as set forth in claim 3 wherein the elongated inner housing has a rectangular cross-sectional shape.

* * * * *